United States Patent
Song et al.

(10) Patent No.: US 9,310,903 B2
(45) Date of Patent: Apr. 12, 2016

(54) DISPLACEMENT DETECTION DEVICE WITH NO HOVERING FUNCTION AND COMPUTER SYSTEM INCLUDING THE SAME

(71) Applicant: PIXART IMAGING INC., Hsin-Chu County (TW)

(72) Inventors: Willie Song, Penang (MY); Kevin Len-Li Lim, Pulau Pinang (MY)

(73) Assignee: Pixart Imaging Inc., Hsin-Chu County (TW)

( * ) Notice: Subject to any disclaimer, the term of this patent is extended or adjusted under 35 U.S.C. 154(b) by 199 days.

(21) Appl. No.: 14/100,120

(22) Filed: Dec. 9, 2013

(65) Prior Publication Data

US 2015/0160743 A1    Jun. 11, 2015

(51) Int. Cl.
    *G06F 3/038*      (2013.01)
    *G06F 3/0354*     (2013.01)
    *A63F 13/213*     (2014.01)

(52) U.S. Cl.
    CPC ............ *G06F 3/0383* (2013.01); *A63F 13/213* (2014.09); *G06F 3/03543* (2013.01); *G06F 2203/0381* (2013.01)

(58) Field of Classification Search
    USPC .................................................. 345/156–184
    See application file for complete search history.

(56) References Cited

U.S. PATENT DOCUMENTS

| | | | | |
|---|---|---|---|---|
| 8,866,795 | B1 * | 10/2014 | Spurlock | G06F 3/016 345/174 |
| 2005/0104849 | A1 * | 5/2005 | Hoile | G06F 3/0325 345/157 |
| 2005/0231482 | A1 * | 10/2005 | Theytaz | G06F 3/03543 345/166 |
| 2006/0152487 | A1 * | 7/2006 | Grunnet-Jepsen | G06F 3/0346 345/158 |
| 2007/0008286 | A1 * | 1/2007 | Theytaz | G06F 3/03543 345/166 |
| 2007/0152966 | A1 * | 7/2007 | Krah | G06F 3/016 345/163 |
| 2007/0291001 | A1 * | 12/2007 | Trisnadi | G06F 3/0317 345/166 |
| 2008/0062131 | A1 * | 3/2008 | Chan | G06F 3/0317 345/166 |
| 2009/0016646 | A1 * | 1/2009 | Chen | G06F 3/0317 382/300 |
| 2009/0046061 | A1 * | 2/2009 | Denoue | G06F 3/0304 345/158 |
| 2009/0135140 | A1 * | 5/2009 | Constantin | G06F 3/0317 345/166 |
| 2011/0261231 | A1 * | 10/2011 | Chen | G06F 3/0317 348/239 |
| 2012/0120028 | A1 * | 5/2012 | Kiyose | G06F 3/0428 345/175 |
| 2013/0310123 | A1 * | 11/2013 | Lee | A63F 13/219 463/5 |

* cited by examiner

*Primary Examiner* — Kumar Patel
*Assistant Examiner* — Amy C Onyekaba
(74) *Attorney, Agent, or Firm* — Rosenberg, Klein & Lee

(57) ABSTRACT

A displacement detection device includes an image sensor, a processing unit and an output unit. The image sensor is configured to detect reflected light from a working surface to successively output image frames. The processing unit is configured to identify a hovering height and calculate a first axis displacement and a second axis displacement according to the image frames. The output unit is controlled by the processing unit to output a first ratio of the first axis displacement but not to output the second axis displacement when the hovering height is higher than a predetermined height.

19 Claims, 3 Drawing Sheets

| hovering height | first axis ratio | second axis ratio |
|---|---|---|
| full output range (0mm-1mm) | 100% | 100% |
| 1st height range (1mm-2mm) | 100% | 50% |
| 2nd height range(2mm-3mm) | 50% | 25% |
| hovering range (1mm-3mm) | 50-100% | 0 |
| hovering range (1mm-3mm) | 0 | 50-100% |
| no output range (>3mm) | 0 | 0 |

| hovering height | first axis ratio | second axis ratio |
|---|---|---|
| full output range (0mm-1mm) | 100% | 100% |
| 1st height range (1mm-2mm) | 100% | 50% |
| 2nd height range (2mm-3mm) | 50% | 25% |
| hovering range (1mm-3mm) | 50-100% | 0 |
| hovering range (1mm-3mm) | 0 | 50-100% |
| no output range (>3mm) | 0 | 0 |

DISPLACEMENT DETECTION DEVICE WITH NO HOVERING FUNCTION AND COMPUTER SYSTEM INCLUDING THE SAME

BACKGROUND

1. Field of the Disclosure

This disclosure generally relates to a displacement detection device and, more particularly, to a displacement detection device and a computer system including the same that may partially output the detected displacement in a predetermined axis in hovering operation.

2. Description of the Related Art

Although the user generally uses different computer peripheral devices according to the type of the computer systems, e.g. using an optical finger navigation device, a touch panel, a pointing device or a mouse device to correspondingly control the operation of the computer system, the mouse device is still the mostly used peripheral device. A user may correspondingly control the movement of a cursor shown on a display device using a mouse device so as to perform the game function or the drawing function.

The user generally controls the mouse device by the wrist action, but it is not easy to move a mouse device in a straight line on a working surface so that the movement of the mouse device generally contains movements in two axes. Therefore, if a user is desired to perform the drawing function, it is difficult to draw a straight line by only moving the mouse device such that other peripheral devices (e.g. a predetermined button of a keyboard device) have to be used simultaneously so as to be able to draw a straight line. Or in the game function, it is frequently necessary to perform the single axis operation. However, as mentioned above it is difficult to fulfill this requirement by only using the conventional mouse device.

Accordingly, the present disclosure further provides a displacement detection device and a computer system including the same that may not output the detected displacement in a predetermined axis in hovering operation so as to solve the problem in the conventional mouse device mentioned above.

SUMMARY

The present disclosure provides a displacement detection device and a computer system including the same that may partially output or not output the detected displacement in a predetermined axis in hovering operation.

The present disclosure further provides a displacement detection device and a computer system including the same that may adjust an output ratio of the detected displacement in different axes according to different hovering heights.

The present disclosure provides a displacement detection device configured to performing contact operation or hovering operation on a working surface. The displacement detection device includes an image sensor and a processing unit. The image sensor is configured to detect reflected light from the working surface and successively output image frames. The processing unit is configured to identify a contact mode or a hovering mode, calculate a first axis displacement and a second axis displacement according to the image frames, and output the first axis displacement and the second axis displacement in full scale in the contact mode and output a first ratio of the first axis displacement and a second ratio of the second axis displacement in the hovering mode, wherein the second ratio is different from the first ratio.

The present disclosure further provides a computer system including a displacement detection device and a host. The displacement detection device is configured to perform hovering operation upon a working surface and includes an image sensor, a processing unit and an output unit. The image sensor is configured to detect reflected light from the working surface and successively output image frames. The processing unit is configured to identify a hovering mode and calculate a first axis displacement and a second axis displacement according to the image frames. The output unit is controlled by the processing unit to output a hovering mode signal and output the first axis displacement and the second axis displacement in full scale when entering the hovering mode. The host takes a first ratio of the first axis displacement as a first control value and a second ratio of the second axis displacement as a second control value when receiving the hovering mode signal, wherein the second ratio is different from the first ratio.

The present disclosure further provides a displacement detection device for being operated on a working surface including an image sensor, a processing unit and an output unit. The image sensor is configured to detect reflected light from the working surface and successively output image frames. The processing unit is configured to identify a hovering height and calculate a first axis displacement and a second axis displacement according to the image frames. The output unit is controlled by the processing unit to output a first ratio of the first axis displacement but not to output the second axis displacement when the hovering height is higher than a predetermined height.

In one aspect, the displacement detection device further includes a data storage module thereby having the flash drive function. The host may access data of the displacement detection device wired (e.g. via the USB interface) or wirelessly (e.g. via the blue tooth or wireless radio).

In one aspect, the displacement detection device outputs the detected displacement with an adjustable report rate, wherein the report rate may be selected by the user or automatically determined according to a program currently executed by the host. For example, the report rate may be decreased when the word processing software is running so as to reduce the power consumption.

In one aspect, the displacement detection device may include a microphone and/or a speaker for playing sound effects or prompting sound effects, performing the telephone conference and so on.

In one aspect, the processing unit identifies the contact mode and the hovering mode according to a characteristic value, a brightness distribution or a reflected light intensity.

In one aspect, the displacement detection device may further include a thermal sensor configured to detect a temperature reading of the working surface, and the processing unit identifies the contact mode and the hovering mode according to the temperature reading.

In the displacement detection device and the computer system according to the embodiment of the present disclosure, when the hovering height exceeds a predetermined height, the displacement detection device outputs a first ratio of the first axis displacement only but does not output the second axis displacement such that the user may easily perform the single axis operation thereby increasing the practicability. In addition, when the hovering height is smaller than the predetermined height, the displacement detection device still outputs the first axis displacement and the second axis displacement in full scale.

Therefore, in the hovering operation of the displacement detection device according to the embodiment of the present disclosure, e.g. a game program, when the displacement detection device glides over a working surface toward left or right, the displacement detection device may suppress the unwanted forward and backward displacement but only output the desired leftward and rightward displacement so as to correctly control the cursor motion or correctly output the direction parameter according to the requirement.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
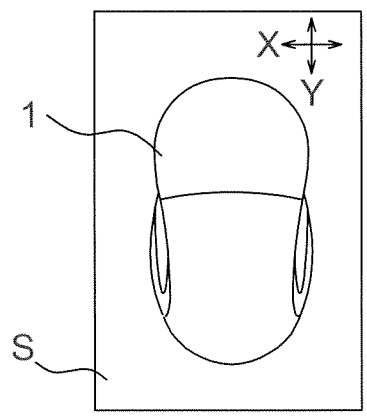
FIG. 1 shows an upper view of the displacement detection device according to an embodiment of the present disclosure.
Figure 2:
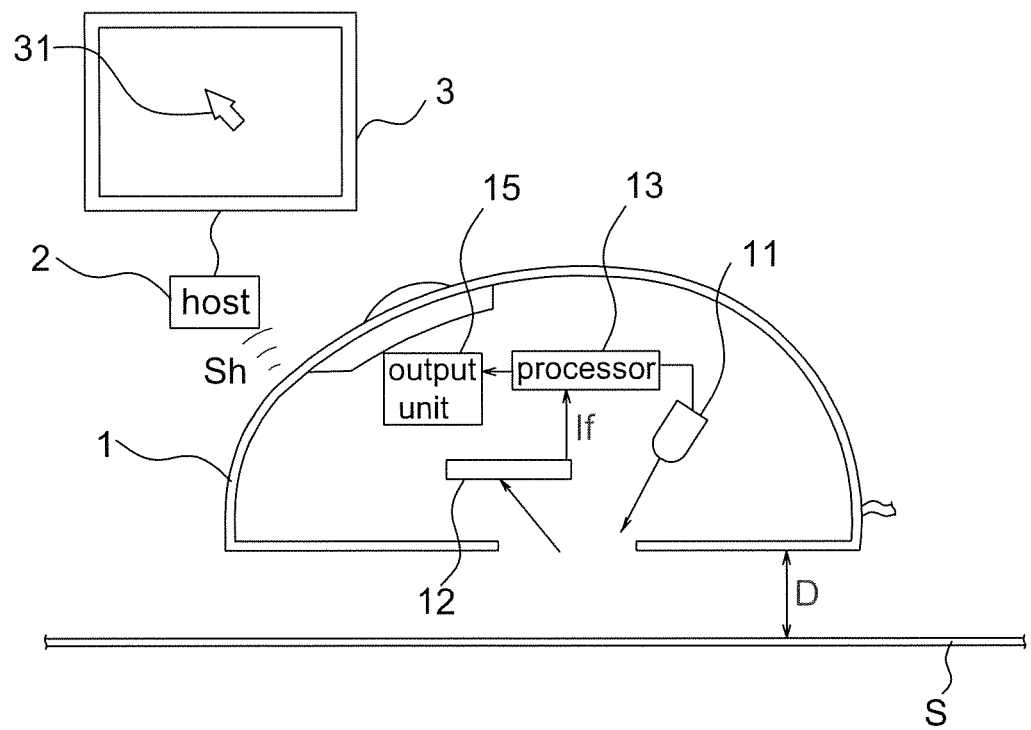
FIG. 2 shows a schematic block diagram of the computer system according to an embodiment of the present disclosure.

Referring to FIG. 1, it shows an upper view of the displacement detection device 1 according to an embodiment of the present disclosure. The displacement detection device 1 is for being operated on a working surface S by a user (not shown) so as to perform contact operation or hovering operation, wherein said contact operation is referred to that a bottom surface of the displacement detection device 1 is directly in contact with the working surface S whereas said hovering operation is referred to that a bottom surface of the displacement detection device 1 leaves from the working surface S by a hovering height D (as shown in FIG. 2). In this embodiment, the displacement detection device 1 enters a contact mode in the contact operation, and the displacement detection device 1 outputs a first axis (e.g. the X axis in FIG. 1) displacement and a second axis (e.g. the Y axis in FIG. 1) displacement detected thereby in full scale. The displacement detection device 1 enters a hovering mode in the hovering operation, and the displacement detection device 1 outputs a first ratio of the detected first axis displacement and a second ratio of the detected second axis displacement, wherein the second ratio is different from the first ratio.

Referring to FIG. 2, it shows a schematic block diagram of the computer system according to an embodiment of the present disclosure, which includes the displacement detection device 1, a host 2 and a display device 3, wherein the display device 3 may show a cursor 3 thereon. In this embodiment, in the hovering mode the displacement detection device 1 calculates a hovering height D at first and then the first ratio and the second ratio may be determined by the displacement detection device 1 (e.g. implemented by hardware) or by the host 2 (e.g. implemented by software) according to the hovering height D.

The displacement detection device 1 includes a light source 11, an image sensor 12, a processing unit 13 and an output unit 15. In one embodiment, the displacement detection device 1 may be an optical mouse. It should be mentioned that although FIG. 2 shows that the output unit 15 and the processing unit 13 are separated elements, it is not to limit the present disclosure. In other embodiments, the output unit 15 and the processing unit 13 may both be integrated in a same chip, e.g. in a mouse chip.

The light source 11 may be a red light source or an invisible light source configured to illuminate a working surface S through an opening at a bottom surface of the displacement detection device 1.

The image sensor 12 may be a CCD image sensor, a CMOS image sensor or other sensing devices configured to convert optical energy to electric signals. The image sensor 12 is configured to detect reflected light from the working surface S and successively output image frames If.

The processing unit 13 may be a single chip, a digital signal processor (DSP) or other processors for processing the image data. The processing unit 13 is configured to post-process the image frames If outputted by the image sensor 12. The processing unit 13 may identify a contact mode and a hovering mode according to the image frames If, and may calculate a first axis displacement and a second axis displacement according to the image frames If. For example, the processing unit 13 may calculate the displacement according to the correlation between image frames, and the method of calculating the displacement using correlation is well known and thus details thereof are not described herein. The processing unit 13 may directly calculate the first axis displacement and the second axis displacement respectively according to the image frames If, or calculate a displacement at first and then divide the displacement to the first axis displacement and the second axis displacement using vector calculation without particular limitation. The first axis is preferably perpendicular to the second axis.

In this embodiment, the processing unit 13 may identify the contact mode and the hovering mode according to a characteristic value, a brightness distribution and/or a reflected light intensity in the image frames If.

The characteristic value may be a digitized parameter such as a sharpness, a contrast, a characteristic directivity, a number of local maximum in the image frames, but not limited thereto. For example, in the contact mode the characteristic value is the highest, and the characteristic value decreases when the hovering height D increases. The processing unit 13 may divide height ranges, which are previously saved, according to the characteristic value corresponding to different hovering heights D. In actual operation, the processing unit 13 may identify the hovering height D and the contact mode according to the characteristic value contained in the image frames If.

Figure 3A:
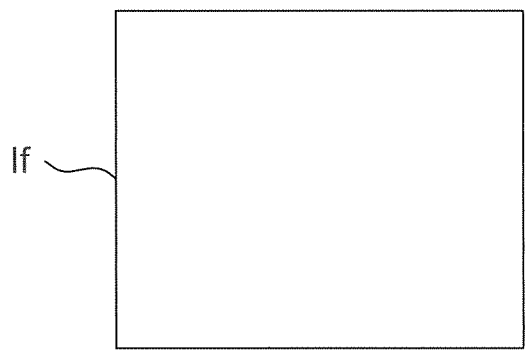
FIGS. 3a-3c show schematic diagrams of the image frame captured by the image sensor of the displacement detection device according to the embodiment of the present disclosure.
Figure 3B:
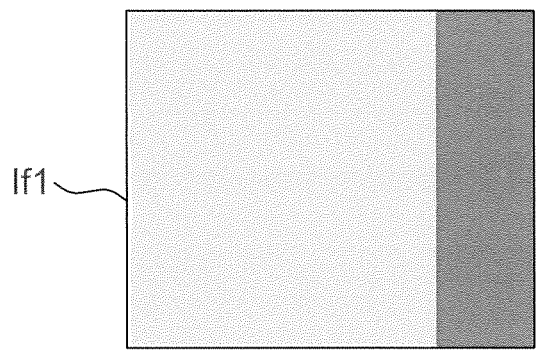
Figure 3C:
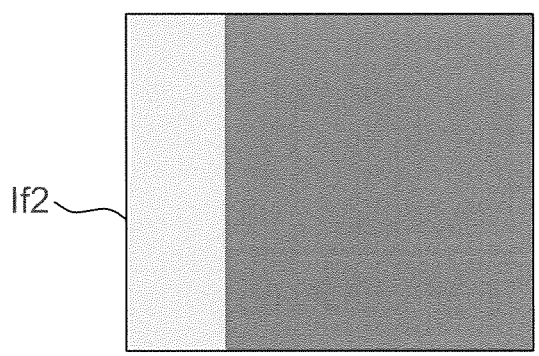

The brightness distribution may be referred to FIG. 3 for example. In the contact mode, the image sensor 12 may capture the image frame If as shown in FIG. 3a; i.e. the whole of a sensing matrix of the image sensor 12 can detect the reflected light from the working surface S. In the hovering mode, for example in a first hovering height the image sensor 12 may capture the image frame If1 as shown in FIG. 3b; for example in a second hovering height the image sensor 12 may capture the image frame If2 as shown in FIG. 3c; i.e. only a part (e.g. the lighter part in FIGS. 3b and 3c) of a sensing array of the image sensor 12 can detect the reflected light from the working surface S. In this embodiment, the brightness distribution shown in FIGS. 3a-3c may be implemented by properly disposing the light source 11 and the image sensor 12, and in some embodiments the brightness distribution may be implemented by further disposing optical components such as the lens or light guide. However, the brightness distribution is not limited to those shown in FIGS. 3b-3c as long as the brightness distribution in the image frames If changes corresponding to the hovering height D. The processing unit 13 may divide height ranges, which are previously saved, according to the brightness distribution corresponding to different hovering heights D. In actual operation, the processing unit 13 may identify the hovering height D and the contact mode according to the brightness distribution in the image frames If.

The processing unit 13 may identify the hovering height D according to the reflected light intensity of the image frames If captured by the image sensor 12, and the reflected light intensity may be indicated by the gray value, wherein the gray value may be an average gray value, a maximum gray value, a local average gray value or a local maximum gray value of an image frame If, but not limited thereto. For example, in the contact mode the reflected light intensity is the highness, and the reflected light intensity decreases when the hovering height D increases. The processing unit 13 may divide height ranges, which are previously saved, according to the reflected light intensity corresponding to different hovering heights D. In actual operation, the processing unit 13 may identify the hovering height D and the contact mode according to the reflected light intensity in the image frames If.

Figures 4, 5:
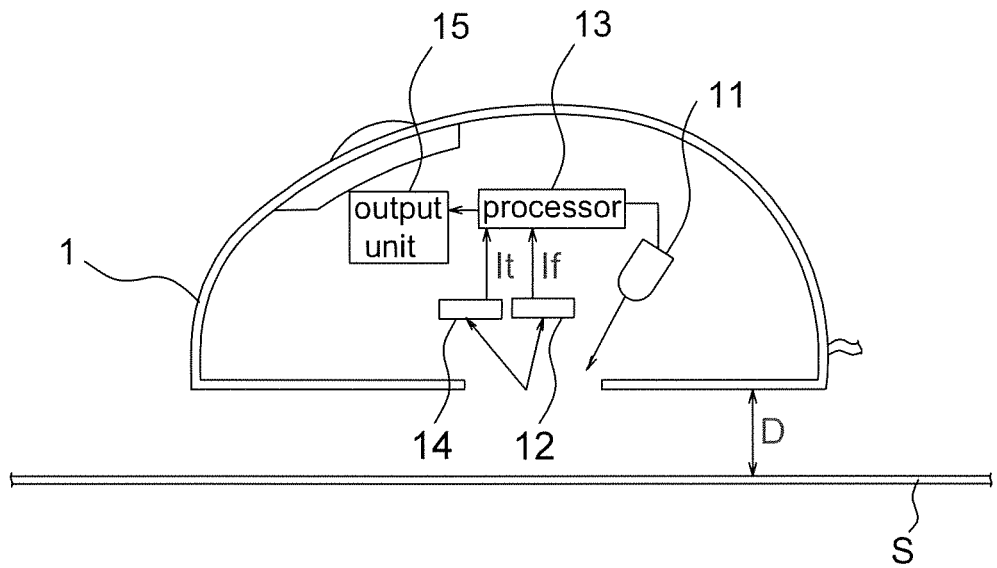
FIG. 4 shows a schematic block diagram of the displacement detection device according to an embodiment of the present disclosure, which includes a thermal sensor.
FIG. 5 shows a schematic diagram of the output ratio corresponding to different hovering heights in the displacement detection device and computer system according to the embodiment of the present disclosure.

Referring to FIG. 4, in other embodiments the displacement detection device 1 may further include a thermal sensor 14 configured to sense a temperature reading It of the working surface S, wherein the thermal sensor 14 may be sensing devices configured to detect thermal energy such as a MEMS thermal sensor, a bolometer array, an infrared photo detector and a microbolometer. The thermal sensor 14 is configured to capture and output the temperature reading It of the working surface S, wherein the temperature reading It may be a voltage signal. For example, in the contact mode the temperature reading It is the highest, and the temperature reading It decreases when the hovering height D increases. The processing unit 13 may divide height ranges, which are previously saved, according to the temperature reading It corresponding to different hovering heights D. In actual operation, the processing unit 13 may identify the hovering height D and the contact mode according to the temperature reading It sensed by the thermal sensor 14.

In order to increase the accuracy of identifying the hovering height D, the displacement detection device 1 may previously save a variation ratio (percent per mm) or an offset of the characteristic value, reflected light intensity or temperature reading corresponding to different hovering heights D, e.g. saving in a storage unit. The user may operate, before actually starting to use, the displacement detection device 1 in the contact mode for a predetermined time interval for training so as to recognize the characteristic value, reflected light intensity or temperature reading corresponding to a current working surface such that the characteristic value, reflected light intensity and temperature reading corresponding to different hovering heights D may be obtained according to the previously saved variation ratio or the offset in order to identify different hovering heights D in actual operation. Since the characteristic value, reflected light intensity or temperature reading are adjusted according to the working surface S on which the displacement detection device 1 actually operated, the identification accuracy is increased.

The output unit 15 may be a wireless transmission interface (e.g. blue tooth, wireless radio) or a wired transmission interface (e.g. USB interface) for communicating with the host 2, wherein the wireless and wired communication techniques are well known and thus details thereof are not described herein.

In one embodiment, the output unit 15 is controlled by the processing unit 13 so as to output the first axis displacement and the second axis displacement in full scale in the contact mode, and to output a first ratio of the first axis displacement and a second ratio of the second axis displacement in the hovering mode. Referring to FIG. 5, for example the hovering mode may include a first height range and a second height range, wherein within the first height range, the first ratio may be 100% and the second ratio may be 50%, whereas within the second height range, the first ratio may be 50% and the second ratio may be 25%. In one embodiment, the first height range may be 1 mm-2 mm and the second height range may be 2 mm-3 mm. It is appreciated that the height ranges may be determined according to the resolution and the detectable height ranges of the displacement detection device 1 and are not limited to those disclosed herein.

In other embodiments, the output unit 15 is controlled by the processing unit 13 so as to output a first ratio of the first axis displacement only but not to output the second axis displacement when the hovering height D is identified to be higher than or equal to a predetermined height. For example, when the hovering height D is higher than 1 mm, the first ratio may be 50%-100%. When the displacement detection device 1 is in the contact mode or the hovering height D is lower than a predetermined height, the output unit 15 outputs the detected first axis displacement and the detected second axis displacement in full scale. That is, the displacement detection device 1 is still belonging to the contact mode when the hovering height D is lower than the predetermined height, and the displacement detection device 1 enters the hovering mode when the hovering height D exceeds the predetermined height so as to avoid the misidentification when the displacement detection device 1 is too close to the working surface S. It is appreciated that the present embodiment may be arranged as the output unit 15 does not output the first axis displacement but only output a second ratio of the second axis displacement when the hovering height D is identified to be higher than or equal to a predetermined height. It should be mentioned that the predetermined height may be determined according to the resolution of identifying the hovering height D.

The host 2 performs the corresponding control according to the received first axis displacement and the received second axis displacement, e.g. controlling a cursor movement, a game parameter or other parameters that can be controlled by the mouse device. More specifically speaking, the first ratio and the second ratio may be totally determined by the displacement detection device 1, and the host 2 performs the corresponding control directly according to the received values.

In another embodiment, the first ratio and the second ratio may be determined by the host 2. That is, in this embodiment the output unit 26 always output the first axis displacement and the second axis displacement in full scale, and the output unit 26 is controlled by the processing unit 13 to output a hovering mode signal Sh to the host 2 when the hovering mode is entered. When the host 2 receives the hovering mode signal Sh, a first ratio of the first axis displacement is served as a first control value and a second ratio of the second axis displacement is served as a second control value by the host 2 configured to control a cursor movement, a game parameter or other parameters that can be controlled by the mouse device, wherein the first ratio and the second ratio may be those shown in FIG. 5, but not limited thereto. More specifically speaking, the first ratio and the second ratio may be determined by the host 2, and the displacement detection device 1 outputs the detected displacement in full scale and a hovering mode signal Sh, which includes the information of entering the hovering mode and the hovering height D. Before the host 2 receives the hovering mode signal Sh, the host 2 takes the first axis displacement as a first control value and the second axis displacement as a second control value.

In this embodiment, for reducing the system power consumption, the output unit 15 may output the first axis displacement and the second axis displacement with an adjustable report rate. For example, when the host 2 is running a word processing program, the output unit 15 may output the detected displacement to the host 2 with a lower report rate.

It is appreciated that the values shown in FIG. 5 are only exemplary but not to limit the present disclosure. The first ratio and the second ratio may be previously set according to actual requirements or selected by the user without particular limitation.

In another embodiment, the ratios of the first axis displacement (e.g. the first ratio) and the second axis displacement (e.g. the second ratio) may also be determined by the processing unit 13. More specifically speaking, the processing unit 13 further generates the first ratio of the first axis displacement and the second ratio of the second axis displacement, and the output unit 15 simply wirelessly or wired sends the displacement received from the processing unit 13 to the host 2 without changing the value of the displacement.

As mentioned above, the conventional optical mouse can simply output the detected displacement but can not partially output or stop outputting the detected displacement in a predetermined axis such that it is inconvenient to use in some conditions. Therefore, the present disclosure further provides a displacement detection device (FIGS. 1 and 4) and a computer system including the same (FIG. 2) that may partially output or not output the detected displacement in a predetermined axis according to different hovering heights thereby increasing the practicability thereof.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A displacement detection device, configured to perform contact operation or hovering operation on a working surface, the displacement detection device comprising:
   an image sensor configured to detect reflected light from the working surface and successively output image frames; and
   a processing unit configured to
      identify a contact mode or a hovering mode,
      calculate a first axis displacement and a second axis displacement according to the image frames,
      output the first axis displacement and the second axis displacement in full scale in the contact mode and
      output a first ratio of the first axis displacement and a second ratio of the second axis displacement in the hovering mode,
   wherein the second ratio is different from the first ratio, and the first ratio is 50%-100%.

2. The displacement detection device as claimed in claim 1, wherein the hovering mode comprises a first height range and a second height range,
   within the first height range, the first ratio is 100% and the second ratio is 50%; and
   within the second height range, the first ratio is 50% and the second ratio is 25%.

3. The displacement detection device as claimed in claim 2, wherein the first height range is 1 mm-2 mm and the second height range is 2 mm-3 mm.

4. The displacement detection device as claimed in claim 1, wherein the processing unit is configured to identify the contact mode and the hovering mode according to a characteristic value, a brightness distribution or a reflected light intensity in the image frames.

5. The displacement detection device as claimed in claim 1, further comprising a thermal sensor configured to detect a temperature reading of the working surface, wherein the processing unit is configured to identify the contact mode and the hovering mode according to the temperature reading.

6. The displacement detection device as claimed in claim 1, further comprising an output unit configured to send the first ratio of the first axis displacement and the second ratio of the second axis displacement in a wireless or wired manner.

7. A computer system, comprising:
   a displacement detection device, configured to perform hovering operation upon a working surface, the displacement detection device comprising:
      an image sensor configured to detect reflected light from the working surface and successively output image frames;
      a processing unit configured to identify a hovering mode and calculate a first axis displacement and a second axis displacement according to the image frames; and
      an output unit controlled by the processing unit and configured to output a hovering mode signal and output the first axis displacement and the second axis displacement in full scale when entering the hovering mode; and
   a host configured to take a first ratio of the first axis displacement as a first control value and a second ratio of the second axis displacement as a second control value when receiving the hovering mode signal,
   wherein the second ratio is different from the first ratio, and the first ratio is 50%-100%.

8. The computer system as claimed in claim 7, wherein the hovering mode comprises a first height range and a second height range,
   within the first height range, the first ratio is 100% and the second ratio is 50%; and
   within the second height range, the first ratio is 50% and the second ratio is 25%.

9. The computer system as claimed in claim 8, wherein the first height range is 1 mm-2 mm and the second height range is 2 mm-3 mm.

10. The computer system as claimed in claim 7, wherein the processing unit is configured to identify the hovering mode according to a characteristic value, a brightness distribution or a reflected light intensity in the image frames.

11. The computer system as claimed in claim 7, further comprising a thermal sensor configured to detect a temperature reading of the working surface, wherein the processing unit is configured to identify the hovering mode according to the temperature reading.

12. The computer system as claimed in claim 7, wherein the first control value and the second control value are configured to control a cursor movement or a game parameter.

13. The computer system as claimed in claim 7, wherein the output unit is a wireless interface or a wired interface.

14. The computer system as claimed in claim 7, wherein the output unit is configured to output the first axis displacement and the second axis displacement with an adjustable report rate.

15. A displacement detection device, operated on a working surface, the displacement detection device comprising:
- an image sensor configured to detect reflected light from the working surface and successively output image frames;
- a processing unit configured to identify a hovering height and calculate a first axis displacement and a second axis displacement according to the image frames; and
- an output unit controlled by the processing unit and configured to output a first ratio of the first axis displacement but not to output the second axis displacement when the hovering height is higher than a predetermined height, wherein the first ratio is 50%-100%.

16. The displacement detection device as claimed in claim 15, wherein the first ratio of the first axis displacement is generated by the processing unit.

17. The displacement detection device as claimed in claim 15, wherein the predetermined height is 1 mm.

18. The displacement detection device as claimed in claim 15, wherein when the hovering height is lower than the predetermined height, the output unit is configured to output the first axis displacement and the second axis displacement in full scale.

19. The displacement detection device as claimed in claim 15, wherein the processing unit is configured to identify the hovering height according to a characteristic value, a brightness distribution, a reflected light intensity in the image frames or a temperature reading of the working surface.

\* \* \* \* \*